March 1, 1932.　　J. KINDERVATER　　1,847,693
POWER DEVICE FOR OPERATING REVERSE GEARS
Filed Jan. 10, 1930
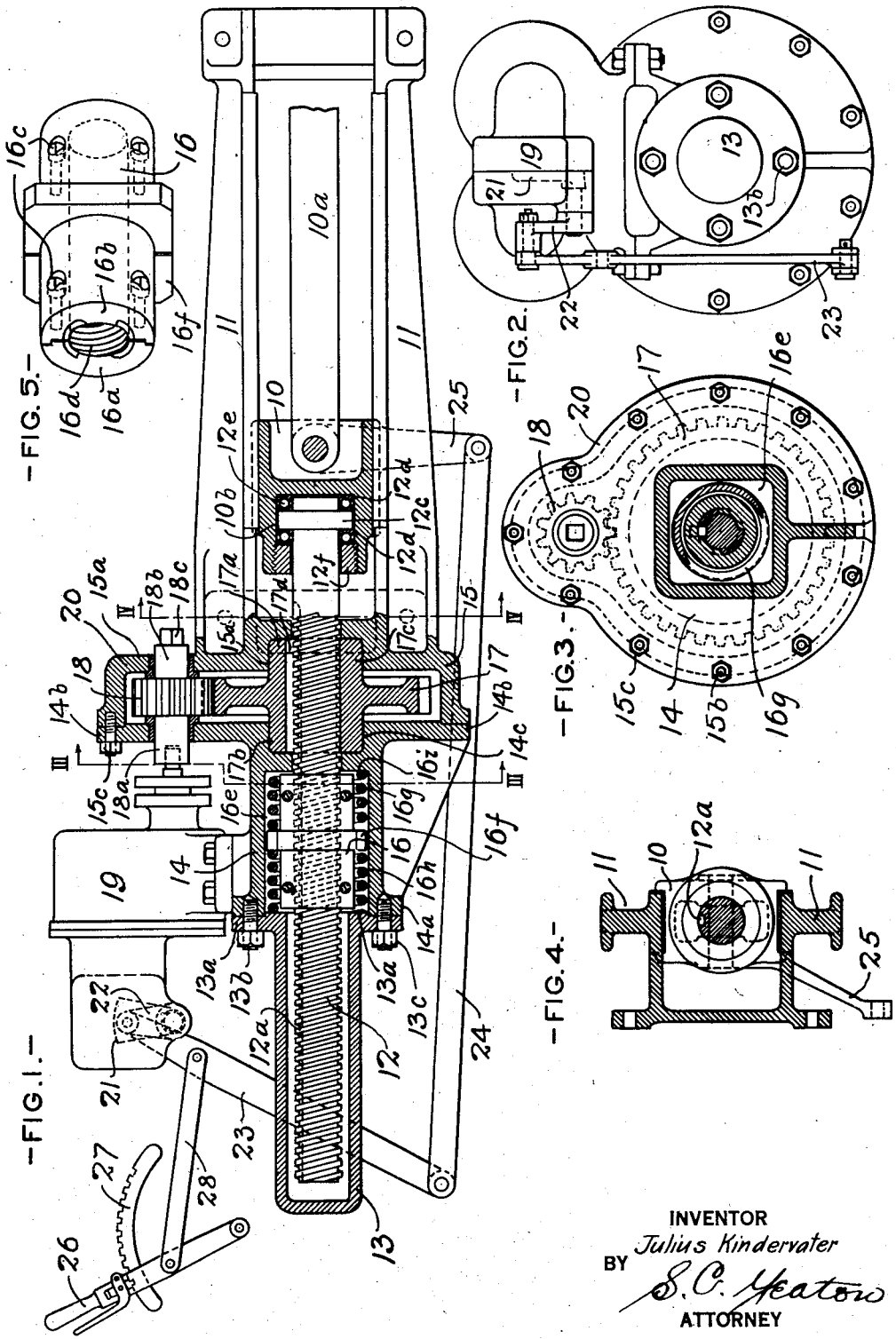
INVENTOR
*Julius Kindervater*
BY
*S. C. Yeaton*
ATTORNEY Patented Mar. 1, 1932

1,847,693

UNITED STATES PATENT OFFICE

JULIUS KINDERVATER, OF GREAT NECK, NEW YORK

POWER DEVICE FOR OPERATING REVERSE GEARS

Application filed January 10, 1930. Serial No. 419,762.

This invention relates to power devices for operating mechanisms such as the reverse gear or the throttle of a locomotive, and has for an object to provide such a device, which is more economical to manufacture and maintain, and which is more efficient in operation than those heretofore known.

Other objects of the invention will hereinafter readily appear.

The improvement claimed is hereinafter fully set forth.

In the accompanying drawings: Figure 1 is a view partly in side elevation, and partly in longitudinal central vertical section of a mechanism embodying the invention; Fig. 2, a rear end view in elevation of the mechanism shown in Fig. 1; Fig. 3, a transverse vertical section taken on the line III—III of Fig. 1; Fig. 4, a transverse vertical section taken on the line IV—IV of Fig. 1; and, Fig. 5, an isometric view of the split nut used in the mechanism.

In the practice of the invention, referring descriptively to the specific embodiment thereof which is herein exemplified, a cross head 10, connected to a power rod 10a for operating a power reverse gear (not shown), is mounted to slide between guides 11 and is adapted to be moved in reverse directions by a screw shaft 12, which is rotatably connected to the cross head by a thrust bearing. The screw shaft is enclosed in a casing composed of a rear, an intermediate, and a front casting, respectively numbered 13, 14 and 15. To provide for effecting longitudinal movement of the screw shaft, there are mounted thereon a split nut 16, and a gear wheel 17.

The split nut, is of cylindrical form and is split longitudinally into two half sections 16a, 16b, which are clamped together by screws 16c. The bore of the split nut is formed with a screw thread 16d which meshes with the thread on the screw shaft. The nut is housed in a chamber 16e formed in the intermediate casting 14, and is held from rotation by making the chamber 16e square in cross section, and providing a square flange 16f on the nut intermediate the ends thereof which flange is adapted to snugly fit the walls of the chamber. To provide for cushioning the stresses applied to the split nut by the screw shaft 12, the nut is made of less length than the chamber 16e, and carries helical springs 16g, 16h, one surrounding the nut on each side of the flange 16f. One end of the spring 16g bears on the nut flange 16f, and its other end bears on a flange 16i formed on the casting 14, at the front end of the chamber 16e. One end of the spring 16h bears on the nut flange 16f, and its other end bears on a flange 13a at the rear end of the chamber 16e. The flanges 16i and 13a of the chamber 16e project inwardly of the nut and serve as stops to limit movement of the nut in opposite directions. By referring to Fig. 1 of the drawings it will be seen that the nut is capable of a limited longitudinal movement in two directions, and that such movement will be cushioned by one or the other of springs 16g and 16h.

The rear casting 13 serves as a cap to enclose the rear end of the screw shaft 12, and is fastened to the intermediate casting 14 by studs 13b having their front ends screwed into a flange 14a on the casting 14, and their rear ends projecting through openings in the flange 13a of the rear casting, and provided with nuts 13c.

The gear wheel 17 for rotating the screw shaft is formed with an elongated hub 17a providing trunnions 17b and 17c on which the gear wheel rotates. The trunnion 17b is journalled in a socket 14c formed in the casting 14, and the trunnion 17c is journalled in a socket 15d formed in the casting 15. The hub is provided with an unthreaded bore through which the screw shaft is free to slide, which bore is provided with a groove in which is fitted a spline 17d that projects into a groove 12a extending longitudinally of the threaded portion of the shaft 12. The gear wheel is driven by a pinion wheel 18, which in turn may be driven by any suitable form of reversible motor 19.

The gear wheel and the pinion wheel are enclosed in a housing 20 formed by a flat flange 14b on the intermediate casting and dished flange 15a on the front casting. The pinion wheel 18 is mounted for rotation on trunnions 18a and 18b respectively journalled in the flanges 14b and 15a.

To provide for operating the reverse gear by manual power in the event of failure of the motor, the trunnion 18b is extended through the flange 15a and formed with a squared end 18c for the application of a suitable hand tool.

The flanges 14b and 15a are fastened together by studs 15b and nuts 15c.

To provide the thrust coupling between the cross-head 10 and the screw shaft 12, the cross-head is formed with a socket 10b, and the front end of the screw shaft is provided with an annular flange 12c. Surrounding the shaft and disposed one on each side of the flange 12c are ball bearing races 12d carrying ball bearings 12e. A threaded collar 12f fitted on the shaft and screwed into the outer end of the socket 10b serves to fasten the cross-head to the screw shaft. The threaded collar is adapted for adjustment to take up such wear as occurs on the races and ball bearings.

The mechanism for controlling the operation of the motor is substantially the same as that illustrated in Patent No. 1,140,328, issued May 18, 1915, to C. J. Mellin, and comprises a valve 21 for controlling the admission of pressure fluid to the motor and its exhaust therefrom, an arm 22 for operating the valve, a floating lever 23 having its upper end connected to the arm 22, a reach rod 24 having its rear end connected to the lower end of the floating lever, an arm 25 having its upper end connected to the cross head 10, and its lower end connected to the front end of the reach rod, a hand lever 26, a latch quadrant 27, and a rod 28 connecting the hand lever to the floating lever.

While one of the preferred forms of construction has been described and shown, it is obvious that many variations in procedure, form, arrangement and construction of parts, may be resorted to, and the invention, therefore, is not limited to the particular embodiment disclosed, but includes such changes and modifications as come within the spirit and scope of the invention as set forth in the appended claims.

The invention claimed and desired to be secured by Letters Patent is:

1. In an apparatus of the character described, the combination of a cross head; a screw threaded shaft; means coupling the shaft to the cross head, said coupling means permitting the shaft to rotate relatively to the cross head without moving the cross head longitudinally relatively thereof: a wheel having a bore through which the shaft passes with the capacity of movement longitudinally of the bore; means locking the shaft to the wheel for rotation therewith, but permitting the shaft to move longitudinally through the bore; a casing surrounding the shaft; a member having an internal screw thread engaging the thread on the shaft; means for holding the member against rotation; means limiting movement of the member longitudinally of the shaft, said means permitting a limited longitudinal movement of the member; a motor; and a driving connection between the motor and the wheel.

2. In an apparatus of the character described, the combination of a cross head; a screw threaded shaft; means coupling the shaft to the cross head, said coupling means permitting the shaft to rotate relatively to the cross head without moving the cross head longitudinally relatively thereof; a wheel having a bore through which the shaft passes with the capacity of movement longitudinally of the bore; means locking the shaft to the wheel for rotation therewith, but permitting the shaft to move longitudinally through the bore; a casing surrounding the shaft; a split nut having an internal screw thread engaging the thread on the shaft; means for holding the split nut against rotation; means limiting movement of the split nut longitudinally of the shaft, said means permitting a limited longitudinal movement of the split nut; a motor; and a driving connection between the motor and the wheel.

3. In an apparatus of the character described, the combination of a cross head; a screw threaded shaft; means coupling the shaft to the cross head, said coupling means permitting the shaft to rotate relatively to the cross head without moving the cross head longitudinally relatively thereof; a wheel having a bore through which the shaft passes with the capacity of movement longitudinally of the bore; means locking the shaft to the wheel for rotation therewith but permitting the shaft to move longitudinally through the bore; a casing surrounding the shaft; a chamber in the casing for the reception of an internally threaded member; an internally threaded member in the chamber having its thread engaging the thread on the shaft, said chamber having a form adapted to hold the member against rotation but permitting a limited movement thereof longitudinally of the chamber; a motor; and a driving connection between the motor and the wheel.

4. In an apparatus of the character described, the combination of a cross head; a screw threaded shaft; means coupling the shaft to the cross head, said coupling means permitting the shaft to rotate relatively to the cross head without moving the cross head longitudinally relatively thereof; a wheel having a bore through which the shaft passes with the capacity of movement longitudinally of the bore; means locking the shaft to the wheel for rotation therewith, but permitting the shaft to move longitudinally through the bore; a casing surrounding the shaft; a chamber in the casing for the reception of an internally threaded member; an internally threaded member in said chamber having its thread engaging the thread on the shaft, said chamber having end walls adapted to permit a limited movement of the member longitudinally of the chamber; means cushioning longitudinal movement of the the members in said chamber; a motor; and a driving connection between the motor and the wheel.

5. In an apparatus of the character described, the combination of a cross head; a screw threaded shaft; means coupling the shaft to the cross head, said coupling means permitting the shaft to rotate relatively to the cross head without moving the cross head longitudinally relatively thereof; a wheel having a bore through which the shaft passes with the capacity of movement longitudinally of the bore; means locking the shaft to the wheel for rotation therewith but permitting the shaft to move longitudinally through the bore; a casing surrounding the shaft; a chamber in the casing for the reception of an internally threaded member; an internally threaded member in said chamber having its thread engaging the thread on the shaft, said chamber having end walls adapted to permit limited movement of the member longitudinally thereof; resilient means bearing on the member and on each end of the chamber for cushioning movement of the member in opposite directions longitudinally of the chamber; means locking the member against rotation; a motor; and a driving connection between the motor and the wheel.

6. In an apparatus of the character described, the combination of a cross head; a screw threaded shaft; a coupling between the shaft and the cross head; a wheel mounted on the shaft; a casing surrounding the shaft; a chamber in the casing for the reception of an internally threaded member; an internally threaded member in said casing, said member having a flange intermediate its ends, said flange having an angular peripheral edge, said casing having an angular side wall adapted to engage the angular edge of the flange of the member to hold the member against rotation, and end walls permitting limited movement of the member longitudinally of the shaft; a spring interposed between the flange on the member and each end wall of the chamber; a motor; and a driving connection between the motor and the wheel.

7. In an apparatus of the character described, the combination of a power rod; a rotatable and longitudinally movable shaft; means, including a cross-head, connecting the shaft to the rod to impart longitudinal movement thereto; a wheel mounted on the shaft for rotation thereof; means confining the wheel against longitudinal movement with the shaft; means compelling longitudinal movement of the shaft when the shaft is rotated; means for driving said wheel; and a plurality of castings bolted together and comprising a housing for said shaft, a housing for said wheel and said confining means, a housing for said compelling means, and a cross-head guide.

8. In an apparatus of the character described, the combination of a power rod; a rotatable and longitudinally movable shaft; means, including a cross-head, connecting the shaft to the rod to impart longitudinal movement thereto; a wheel mounted on the shaft for rotation thereof; means confining the wheel against longitudinal movement with the shaft; means compelling longitudinal movement of the shaft when the shaft is rotated; means for driving said wheel; and a plurality of castings bolted together and comprising a housing for said shaft, a housing for said wheel and said confining means, a housing for said compelling means, and a cross-head guide, said castings having recesses for receiving the journal of said wheel.

JULIUS KINDERVATER.